(12) United States Patent
Kataoka et al.

(10) Patent No.: US 11,585,290 B2
(45) Date of Patent: Feb. 21, 2023

(54) INTERNAL COMBUSTION ENGINE

(71) Applicant: HONDA MOTOR CO., LTD., Tokyo (JP)

(72) Inventors: Dai Kataoka, Tokyo (JP); Wataru Nagata, Tokyo (JP); Masashi Furuya, Tokyo (JP); Yuichi Tawarada, Tokyo (JP); Teruo Kihara, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/696,103

(22) Filed: Mar. 16, 2022

(65) Prior Publication Data

US 2022/0316417 A1 Oct. 6, 2022

(30) Foreign Application Priority Data

Mar. 31, 2021 (JP) ............................. JP2021-062343

(51) Int. Cl.
*F02F 7/00* (2006.01)
*F02F 1/08* (2006.01)
*F01L 1/02* (2006.01)

(52) U.S. Cl.
CPC .............. *F02F 7/0068* (2013.01); *F02F 1/08* (2013.01); *F02F 7/007* (2013.01); *F01L 1/022* (2013.01); *F01L 2250/02* (2013.01); *F01L 2810/01* (2013.01)

(58) Field of Classification Search
CPC ... F01L 1/022; F01L 2250/02; F01L 2810/01; F02F 1/08; F02F 7/0065; F02F 7/0068; F02F 7/007

USPC ...................................................... 123/90.31
See application file for complete search history.

(56) References Cited

U.S. PATENT DOCUMENTS

| 8,776,756 B2 | 7/2014 | Cotton |
| 9,399,974 B2 | 7/2016 | Ito et al. |
| 2016/0258328 A1* | 9/2016 | Tsukahara ............... F01L 1/022 |
| 2018/0172115 A1* | 6/2018 | Voges ........................ F16H 7/08 |
| 2018/0335111 A1* | 11/2018 | Matsunaga ............... F16H 7/08 |

FOREIGN PATENT DOCUMENTS

| JP | 2011-518280 A | 6/2011 |
| JP | 2019-043204 | 3/2019 |
| JP | 6704945 B2 | 5/2020 |

OTHER PUBLICATIONS

Indian Office Action dated Oct. 19, 2022 issued in corresponding Indian application No. 202244015690; English translation included (5 pages).

* cited by examiner

*Primary Examiner* — Jorge L Leon, Jr.
(74) *Attorney, Agent, or Firm* — Rankin, Hill & Clark LLP

(57) ABSTRACT

In an internal combustion engine that includes a cylinder block and a cylinder head, and has a cam chain chamber on a side of the cylinder block, a beam member that traverses the cam chain chamber is disposed in the cam chain chamber.

8 Claims, 5 Drawing Sheets

INTERNAL COMBUSTION ENGINE

INCORPORATION BY REFERENCE

The present application claims priority under 35 U.S.C. § 119 to Japanese Patent Application No. 2021-062343 filed on Mar. 31, 2021. The content of the application is incorporated herein by reference in its entirety.

TECHNICAL FIELD

The present invention relates to an internal combustion engine.

BACKGROUND ART

Conventionally, there has been known an internal combustion engine that includes a cylinder block and a cylinder head, and has a cam chain chamber on a side of the cylinder block (for example, see patent literature 1).

CITATION LIST

Patent Literature

[patent literature 1] JP-A No. 2019-43204

SUMMARY OF INVENTION

Technical Problem

This type of internal combustion has a drawback with respect to cooling property in cooling a high temperature region in the vicinity of a combustion chamber formed in the cylinder head.

The present invention has been made in view of the above-mentioned circumstances, and it is an object of the present invention to provide an internal combustion engine that can efficiently cool a region in the vicinity of a combustion chamber.

Solution to Problem

To achieve the above-mentioned object, an aspect of the present invention provides an internal combustion engine including a cylinder block and a cylinder head, and having a cam chain chamber on a side of the cylinder block, in which a beam member that traverses the cam chain chamber is disposed in the cam chain chamber.

Advantageous Effects of Invention

According to the aspect of the present invention, the beam member that traverses the cam chain chamber is disposed in the cam chain chamber. With such a configuration, heat of the cylinder block can be drawn by making use of heat outside a cylinder. With such a configuration, a high temperature region in the vicinity of a combustion chamber can be efficiently cooled.

DESCRIPTION OF EMBODIMENTS

The following describes an embodiment of the present invention with reference to the drawings. Note that, in the description, descriptions on directions such as front and rear, right and left, and upper and lower are identical to directions with respect to a vehicle body insofar as descriptions are not particularly given. Reference sign FR illustrated in each drawing indicates a front side of the vehicle body, reference sign UP indicates an upper side of the vehicle body, and reference sign LH indicates a left side of the vehicle body.

Embodiment

Figure 1:
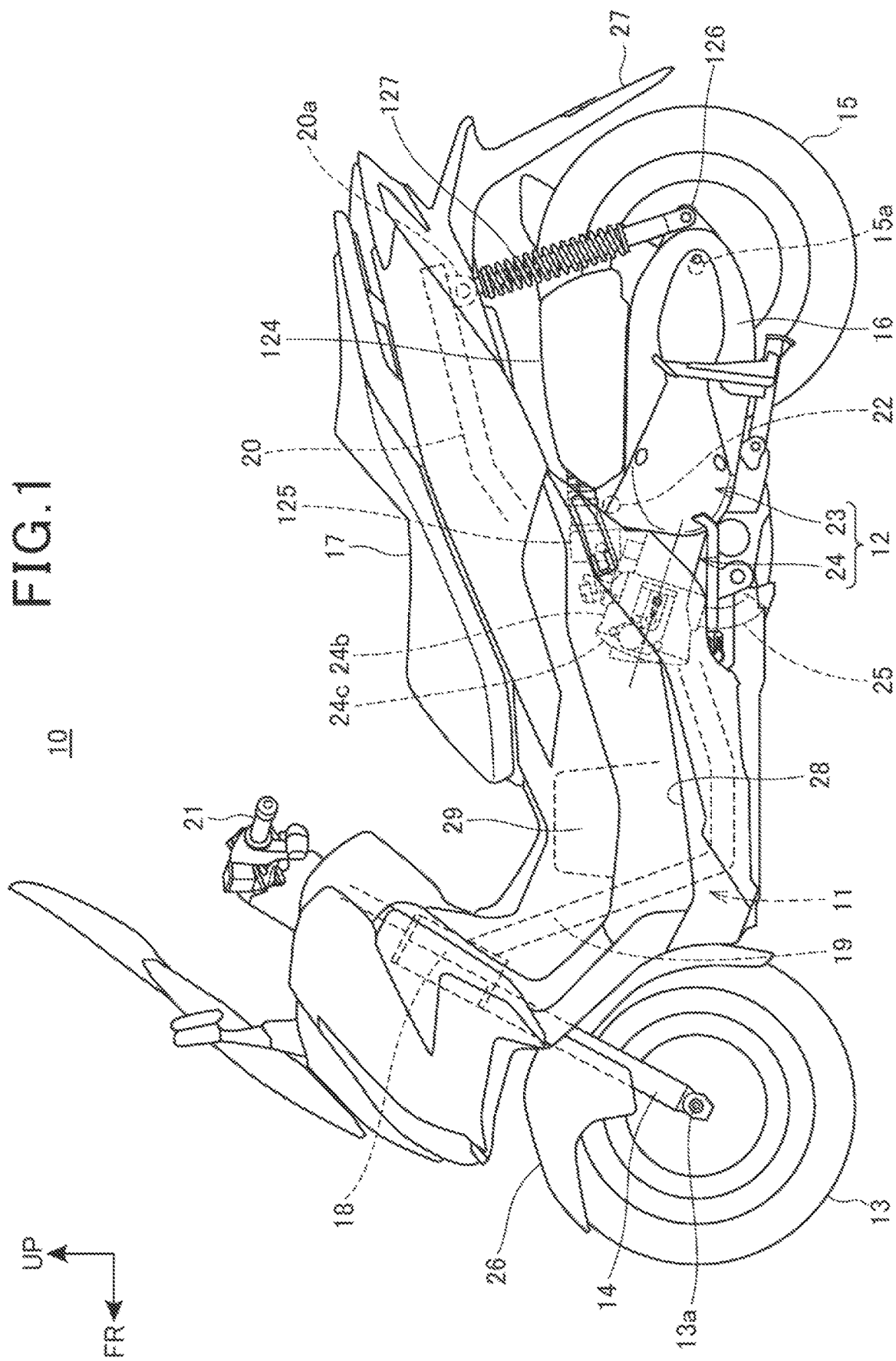
FIG. 1 is a left side view of a saddle riding vehicle.

FIG. 1 is a side view of a saddle riding vehicle 10 according to the embodiment of the present invention.

The saddle riding vehicle 10 is a vehicle including a body frame 11, a power unit 12 supported by the body frame 11, a front fork 14 that steerably supports a front wheel 13, a swing arm 16 that supports a rear wheel 15, and a seat 17 for an occupant.

The saddle riding vehicle 10 is the vehicle on which the occupant straddles the seat 17 to ride. The seat 17 is disposed above a rear portion of the body frame 11.

The body frame 11 includes a head pipe 18 disposed at a front end portion of the body frame 11, a front frame 19 positioned at a rear of the head pipe 18, and a rear frame 20 positioned at a rear of the front frame 19. A front end portion of the front frame 19 is connected to the head pipe 18.

The seat 17 is supported by the rear frame 20.

The front fork 14 is supported by the head pipe 18 so as to be freely steerable in the right and left direction. The front wheel 13 is supported by an axle 13a disposed at a lower end portion of the front fork 14. A handlebar 21 for steering, which is gripped by the occupant, is mounted to an upper end portion of the front fork 14.

The swing arm 16 is supported by a pivot shaft 22 that is supported by the body frame 11. The pivot shaft 22 is a shaft that extends horizontally in a vehicle width direction. The pivot shaft 22 is inserted through a front end portion of the swing arm 16. The swing arm 16 swings in a vertical direction around the pivot shaft 22.

The rear wheel 15 is supported by an axle 15a disposed at a rear end portion of the swing arm 16.

The power unit 12 is arranged between the front wheel 13 and the rear wheel 15, and supported by the body frame 11.

The power unit 12 is an internal combustion engine. The power unit 12 includes a crankcase 23 and a cylinder portion 24 that houses a reciprocating piston. The cylinder portion 24 has an exhaust port to which an exhaust device 25 is connected.

An output from the power unit 12 is transmitted to the rear wheel 15 by a driving force transmitting member that connects the power unit 12 to the rear wheel 15.

The saddle riding vehicle 10 includes a front fender 26 that covers the front wheel 13 from above, a rear fender 27 that covers the rear wheel 15 from above, steps 28 on which the occupant places one's feet, and a fuel tank 29 to store fuel to be used by the power unit 12.

The front fender 26 is mounted to the front fork 14. The rear fender 27 and the steps 28 are disposed below the seat 17. The fuel tank 29 is supported by the body frame 11.

A cushion connecting portion 126 is formed on a rear end of the swing arm 16. A rear cushion 127 extends between the cushion connecting portion 126 and a connecting portion 20a formed on a rear end of the rear frame 20.

The power unit 12 includes an air cleaner box 124, and a throttle body 125 that adjusts an intake air amount.

The air cleaner box 124 purifies air taken in from the outside, and supplied the purified air into the throttle body 125.

Figure 2:
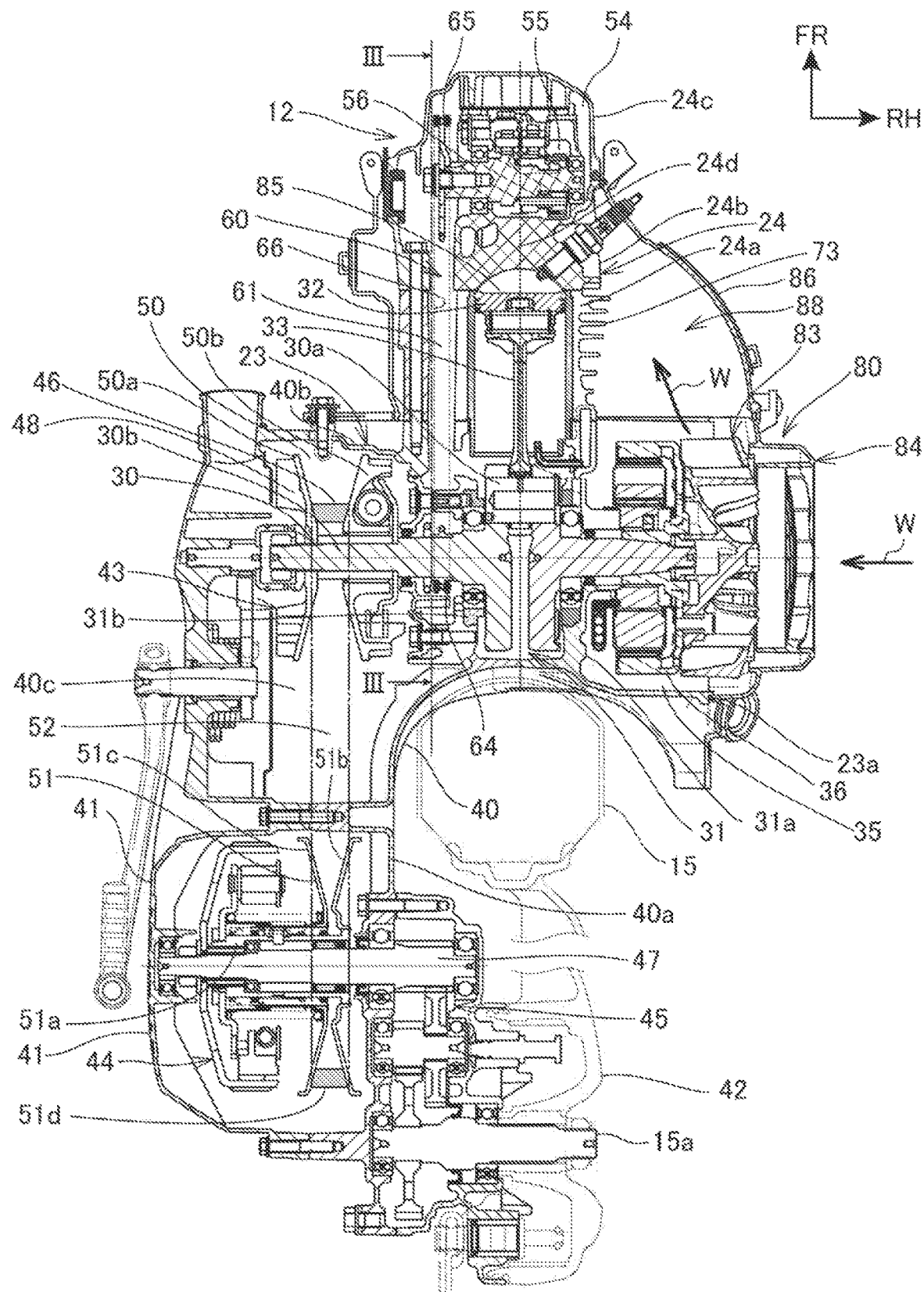
FIG. 2 is a cross-sectional view of a power unit.

FIG. 2 is a cross-sectional view of the power unit 12.

The power unit 12 includes the crankcase 23 and the cylinder portion 24. The cylinder portion 24 includes a cylinder block 24a and a cylinder head 24b. A plurality of heat radiation fins 73 that extend in a circumferential direction are formed on an outer surface of the cylinder block 24a.

The crankcase 23 includes a crank chamber 31 that houses a crankshaft 30 extending in a vehicle width direction (a lateral direction).

The crankshaft 30 is supported by support walls 31a, 31b by way of bearings not illustrated in the drawing. A piston 32 is disposed in the cylinder block 24a.

The piston 32 is connected to a crank pin 30a of the crankshaft 30 by way of a connecting rod 33.

A generator chamber 35 is disposed on a right side in the crank chamber 31. A generator 36 is connected to the crankshaft 30 in the generator chamber 35.

The crankshaft 30 penetrates the generator 36. An air supply device 80 that cools the power unit 12 by air is connected to a right end of the crankshaft 30. The air supply device 80 includes: an air supply fan 83 that rotates integrally with the crankshaft 30; a fan cover 84 that covers the air supply fan 83 from the outside; and a cylinder portion cover 86 that covers the cylinder portion 24.

The cylinder portion cover 86 covers the cylinder block 24a and the cylinder head 24b over the approximately entire circumference.

A space formed between the cylinder portion cover 86 and the cylinder portion 24 forms an air passage 88 through which an air flow W supplied by the air supply device 80 passes.

The air supply fan 83 rotates integrally with the crankshaft 30, takes in air from the outside through the fan cover 84, and blows off the intake air toward the outside of the air supply fan 83 in a radial direction. The air flow W that the air supply fan 83 blows off passes through the air passage 88, and reaches peripheries of the cylinder block 24a and the cylinder head 24b, and forcibly cools the cylinder block 24a and the cylinder head 24b.

The air flow W in the air passage 88 is discharged to the outside from a discharge port (not illustrated in the drawing) formed in the cylinder portion cover 86.

A transmission case portion 40 is disposed on a left side in the crank chamber 31. The transmission case portion 40 extends longitudinally from the crank chamber 31 to a left side of the rear wheel 15.

A sub arm 42 that extends rearward on a side opposite to the swing arm 16 is connected to a rear portion of the crankcase 23. A rear wheel axle 15a is supported by the swing arm 16 and a sub arm 42.

The transmission case portion 40 includes: a case side wall portion 40a that extends longitudinally along an outer side surface of the rear wheel 15; and a case peripheral wall portion 40b that extends toward the outside in a vehicle width direction from a peripheral edge portion of the case side wall portion 40a. One support wall 31a forms a front end portion of the case side wall portion 40a. An open portion 40c defined by the case peripheral wall portion 40b is closed by a case cover 41 fixed to the case peripheral wall portion 40b.

The swing arm 16 is formed of the transmission case portion 40 and the case cover 41. In the swing arm 16, a transmission mechanism 43 that transmits the rotation of the crankshaft 30 to a rear wheel 15 side with a speed change, a centrifugal clutch mechanism 44, and a deceleration mechanism 45 formed of a plurality of gears are disposed.

A drive force of the crankshaft 30 is transmitted to the rear wheel 15 by way of the transmission mechanism 43, the clutch mechanism 44 and the deceleration mechanism 45.

On the other end portion of the crankshaft 30, a pulley support shaft portion 30b that protrudes into the transmission case portion 40 is mounted. On a rear portion of the transmission case portion 40, an output shaft 47 that is disposed parallel to the pulley support shaft portion 30b is mounted. The output shaft 47 is supported by the case side wall portion 40a by way of a bearing not illustrated in the drawing.

The transmission mechanism 43 includes a belt-type variable continuous transmission 46 and a centrifugal fan 48. The variable continuous transmission 46 includes: a drive pulley 50 supported on a pulley support shaft portion 30b; a driven pulley 51 supported on the output shaft 47; and a V belt 52 connecting the drive pulley 50 and the driven pulley 51 to each other.

The drive pulley 50 includes: a disc-shaped fixed pulley member 50a; and a movable pulley member 50b movable in an axial direction.

The movable pulley member 50b moves in the axial direction by being pushed by a roller weight (not illustrated in the drawing) that moves by a centrifugal force generated due to a rotation of the crankshaft 30. With such an operation, a distance between the fixed pulley member 50a and the movable pulley member 50b changes.

The driven pulley 51 includes: an outer shaft 51a rotatably fitted on an outer periphery of the output shaft 47; a fixed pulley member 51b fixed on the outer shaft 51a; and a movable pulley member 51c being movable on the outer shaft 51a in an axial direction.

The movable pulley member 51c is biased so as to move toward a fixed pulley member 51b side by a spring 51d.

With respect to a function of the variable continuous transmission 46, the movable pulley member 51b and the movable pulley member 51c are displaced in the axial direction so that a pulley diameter with respect to the V belt 52 changes whereby a speed shift ratio can be changed in a continuously variable manner.

When the driven pulley 51 is rotated, the clutch mechanism 44 is brought into a connection state due to a centrifugal force and transmits the rotation of the driven pulley 51 to the output shaft 47. The rotation of the output shaft 47 is transmitted to the rear wheel axle 15a by way of the deceleration mechanism 45.

The centrifugal fan 48 is integrally formed on an outer side surface of the fixed pulley member 50a of the drive pulley 50 in a vehicle width direction. The centrifugal fan 48 is mounted on a surface of a side surface of the fixed pulley member 50a on a case cover 41 side.

The cylinder head 24b is disposed in the cylinder portion 24. The cylinder head 24b is covered by the head cover 24c. A valve gear chamber 54 is formed in the head cover 24c, and a valve gear 55 is disposed in the valve gear chamber 54. The valve gear 55 includes an intake valve (not illustrated in the drawing), an exhaust valve (not illustrated in the drawing), and a camshaft 56 that drives the intake valve and the exhaust valve.

The power unit 12 includes a drive force transmission structure 60 that rotatably drives the camshaft 56 due to the rotation of the crankshaft 30.

Figure 3:
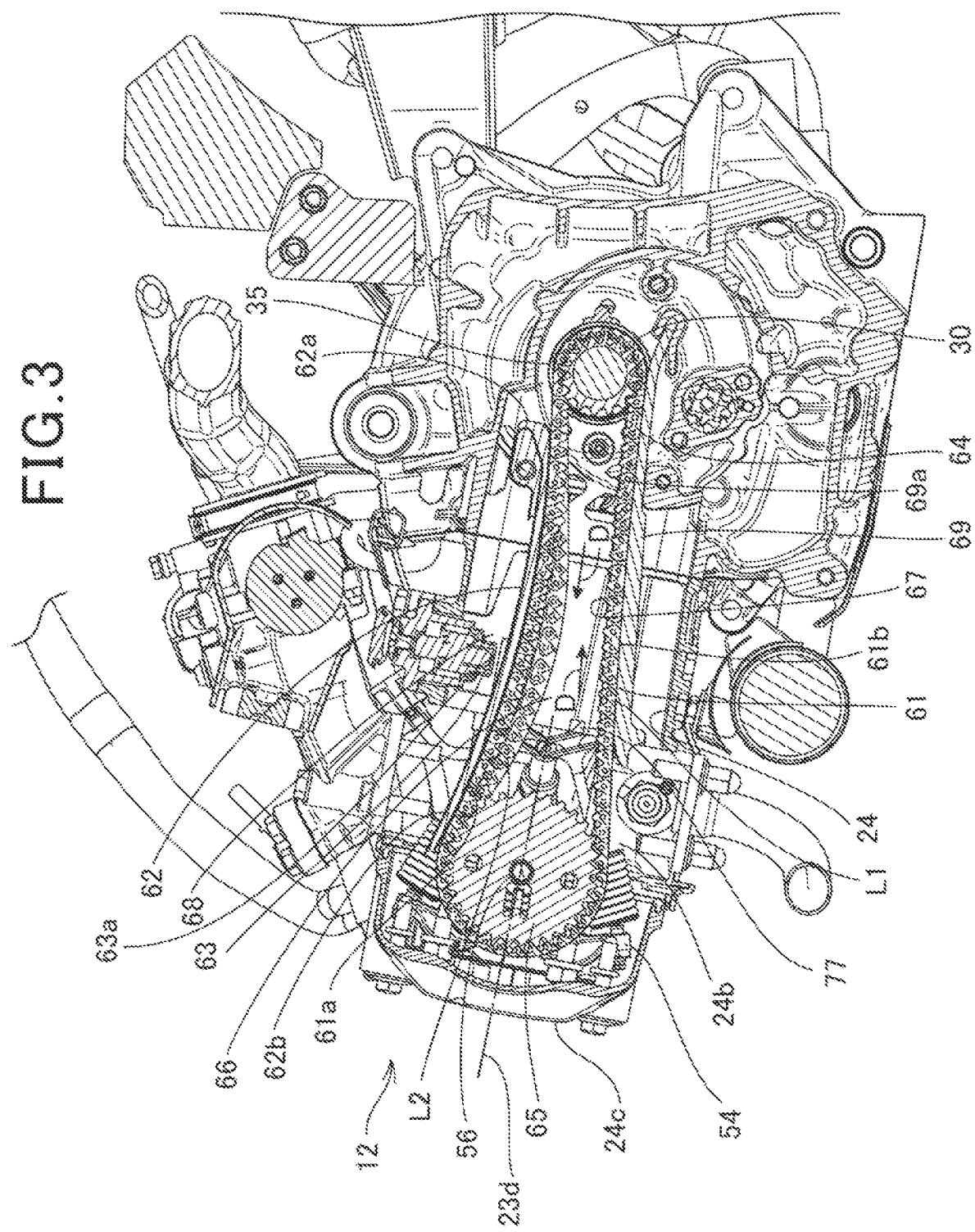
FIG. 3 is a cross-sectional view taken along a line III-III in FIG. 2.

FIG. 3 is a cross-sectional view taken along a line III-III in FIG. 2.

The drive force transmission structure 60 includes: the crankshaft 30; the camshaft 56; an endless cam chain 61 that extends between and is wound around the respective shafts 30, 56; a pushing member 62 that adjusts a tension of the cam chain 61 by pushing the traveling cam chain 61; and a tensioner 63 that pushes the pushing member 62 to the cam chain 61.

The crankshaft 30 includes a drive gear 64. The drive gear 64 is fixed onto the crankshaft 30 in the generator chamber 35. A driven gear 65 is mounted on an end portion of the camshaft 56. The driven gear 65 is a gear having a larger diameter than the drive gear 64.

An inner peripheral portion 61a of the cam chain 61 meshes with teeth portions of the drive gear 64 and the driven gear 65. An endless belt may be used in place of the cam chain 61.

As illustrated in FIG. 2 and FIG. 3, a cam chain chamber 66 that houses the cam chain 61 is formed in the inside of a wall of the cylinder portion 24.

The cam chain chamber 66 makes the generator chamber 35 and the valve gear chamber 54 communicate with each other, and extends in an axial direction of a cylinder axis 23d along a side of the piston 32.

The cam chain 61 is connected to the drive gear 64 in the generator chamber 35, enters the valve gear chamber 54 through the cam chain chamber 66, and is connected to a driven gear 65 in the valve gear chamber 54.

During an operation of the power unit 12, a rotational direction R of the drive gear 64 is a counterclockwise direction illustrated in FIG. 3. With such a configuration, in the cam chain 61, there exist: a first zone portion 67 where the cam chain 61 receives a force in a direction that the cam chain 61 is pulled by the drive gear 64; and a second zone portion 68 where the cam chain 61 receives a force in a direction that the cam chain 61 is pulled by the driven gear 65.

The first zone portion 67 is a portion below the drive gear 64 and the driven gear 65, and the second zone portion 68 is a portion above the drive gear 64 and the driven gear 65. A traveling direction D of the cam chain 61 is an approximately horizontal direction.

In the cam chain chamber 66, a slider 69 that guides the first zone portion 67 is disposed. The slider 69 is slidably brought into contact with an outer peripheral portion 61b of the cam chain 61 in the first zone portion 67. The slider 69 is fixed to an inner surface of a wall of the power unit 12.

A slide contact surface 69a that is slidably brought into contact with the outer peripheral portion 61b of the first zone portion 67 is formed on the slider 69. The slide contact surface 69a is formed in a concave shape, and the first zone portion 67 travels while being guided by a concave portion of the slide contact surface 69a.

The tensioner 63 includes: a pin-shaped pushing portion 63a; and a spring (not illustrated in the drawing) that biases the pushing portion 63a toward the pushing member 62.

The pushing member 62 extends in a longitudinal direction along the cylinder axis 23d. One end portion 62a of the pushing member 62 is disposed in the generator chamber 35. The other end portion 62b of the pushing member 62 is positioned in the vicinity of the driven gear 65 in the cylinder head 24b.

Figure 4:
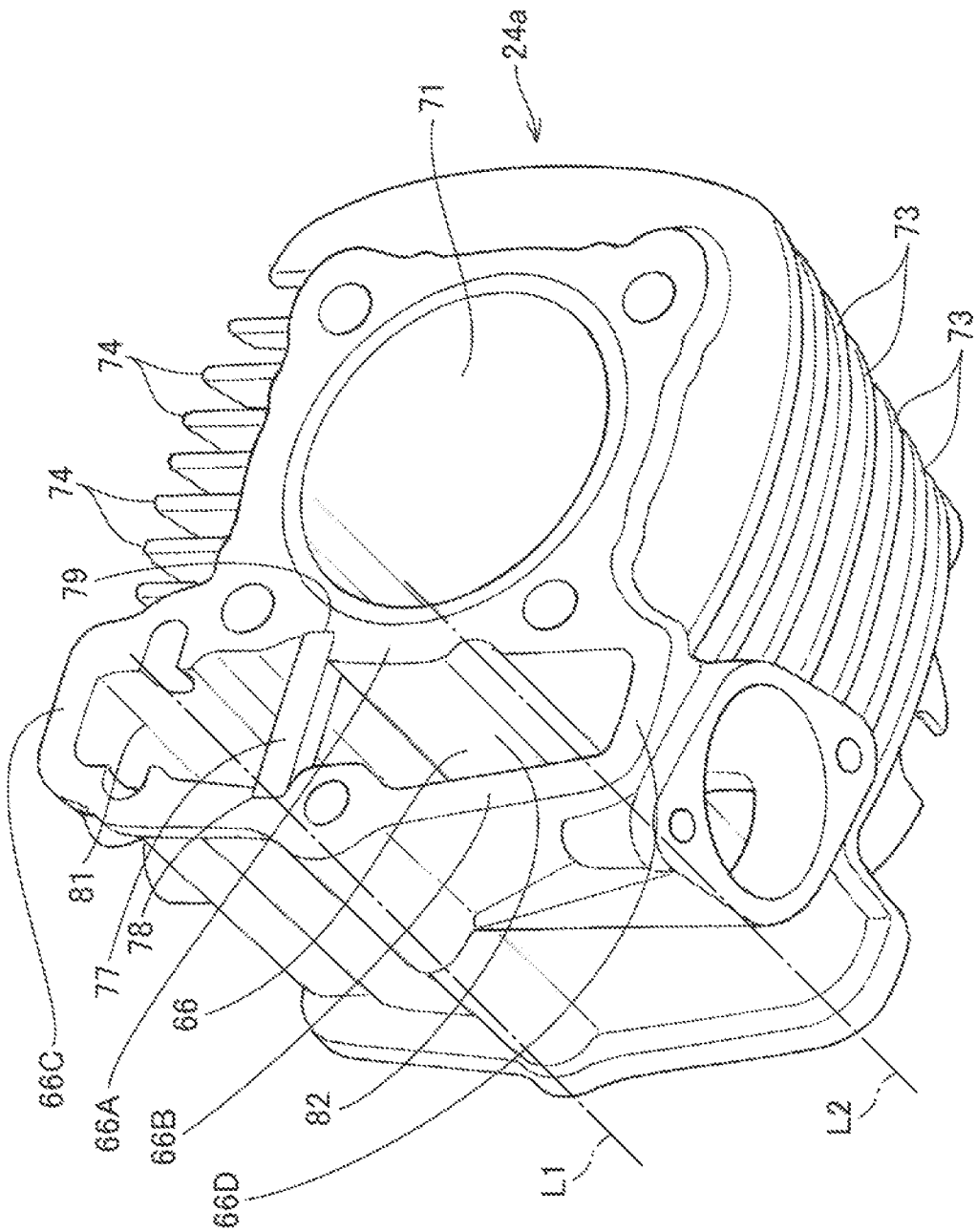
FIG. 4 is a perspective view of a cylinder portion.
Figure 5:
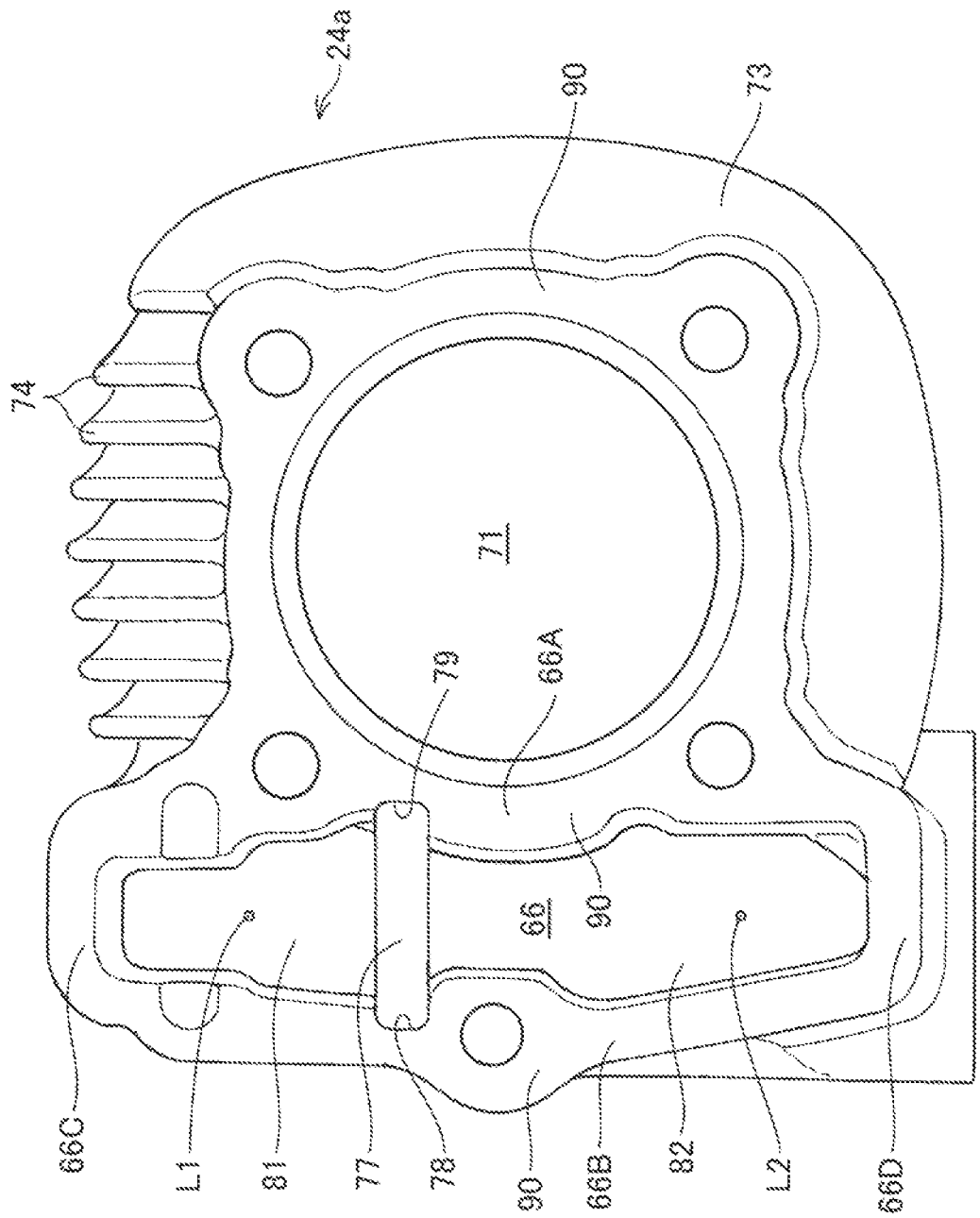
FIG. 5 is a plan view of the cylinder portion.

FIG. 4 is a perspective view of the cylinder block 24a, and FIG. 5 is a plan view of the cylinder block 24a.

The cylinder block 24a includes a cylinder chamber 71 in which the piston 32 slides. The cam chain chamber 66 is disposed on one side of the cylinder chamber 71.

The cam chain chamber 66 is formed in the inside of a wall of the cylinder block 24a. The cam chain chamber 66 is formed in a longitudinally elongated shape as viewed in cross section. The cam chain chamber 66 is surrounded by: an inner wall 66A disposed on a cylinder chamber 71 side; an outer wall 66B that faces the inner wall 66A; and a pair of end walls 66C, 66D that connect the inner wall 66A and the outer wall 66B to each other.

The pair of end walls 66C, 66D and the outer wall 66B are positioned in the air passage 88 (see FIG. 2) through which the air flow W from the air supply device 80 passes.

A plurality of heat radiation fins 73 that extend in a circumferential direction, and a plurality of heat radiation fins 74 that extend in the axial direction of the cylinder axis 23d are formed on an outer peripheral surface of the cylinder chamber 71.

In this embodiment, in the cam chain chamber 66 of the cylinder block 24a, a beam member 77 is disposed in a state where the beam member 77 traverses the cam chain chamber 66. The beam member 77 is made of metal and has a solid plate shape. That is, the beam member 77 is an approximately stereoscopic body that extends with a uniform width and a uniform height.

The beam member 77 is a heat transfer member, and extends between the inner wall 66A and the outer wall 66B so as to thermally connect the inner wall 66A and the outer wall 66B to each other.

In this embodiment, the outer wall 66B is positioned in the air passage 88 (see FIG. 2) and hence, the outer wall 66B is forcibly cooled by the air flow W. With such a configuration, the beam member 77 that traverses the cam chain chamber 66 can more easily draw heat from the inner wall 66A to the outer wall 66B and hence, heat of the cylinder block 24a can be drawn by making use of heat of an outer portion of the cylinder.

The beam member 77 is disposed at a position where the beam member 77 overlaps with the cylinder chamber 71 as viewed in a side view from an outer wall 66B side of the cylinder block 24a.

The beam member 77 is disposed at portions 78, 79 having a thin wall thickness where a wall thickness between the cam chain chamber 66 and the cylinder chamber 71 becomes thin in cross section of the cylinder block 24a.

As illustrated in FIG. 3, the endless cam chain 61 is formed of: the first zone portion 67 that receives a force in a direction that the cam chain 61 is pulled by the drive gear 64; and the second zone portion 68 that receives a force in a direction that the cam chain 61 is pulled by the driven gear 65. The pushing member 62 is pushed to the second zone portion 68 by the tensioner 63.

In the cam chain chamber 66, a first chain region 81 and a second chain region 82 are formed with the beam member 77 sandwiched between the first chain region 81 and the second chain region 82. The first zone portion 67 of the cam chain 61 is positioned in the first chain region 81. The second zone portion 68 of the cam chain 61 is positioned in the second chain region 82.

The tensioner 63 that pushes the pushing member 62 to the cam chain 61 is disposed on a second chain region 82 side.

The beam member 77 having a plate shape is disposed within the winding of the cam chain 61.

The cam chain 61 reciprocates in the cam chain chamber 66 along cam chain lines L1, L2. The pushing member 62 and the tensioner 63 are disposed on the cam chain line L2 side.

The beam member 77 having a plate shape is disposed closed to either one of the cam chain lines L1, L2 that reciprocate in the cam chain chamber 66.

In this embodiment, out of the cam chain lines L1, L2 that reciprocate in the cam chain chamber 66, the beam member 77 is disposed close to the cam chain line L1 on a side opposite to a side where the tensioner 63 is disposed.

The beam member 77 is disposed close to a combustion chamber 85 (see FIG. 2) formed inside the cylinder head 24b.

In this embodiment, the beam member 77 that traverses the cam chain chamber 66 is provided. With such a configuration, heat of the cylinder block 24a can be drawn by making use of heat outside the cylinder. The beam member 77 is detachably mounted in the cam chain chamber 66. The cam chain 61 is an endless shaped chain. With such a configuration, assembling of the cam chain 61 is not obstructed by mounting the beam member 77 in a detachable manner.

The beam member 77 overlaps with the cylinder chamber 71 as viewed in a side view. With such a configuration, the portion that is liable to become a highest temperature portion can be cooled.

The beam member 77 is disposed at the portions having a thin wall thickness where a wall thickness between the cam chain chamber 66 and the cylinder chamber 71 become thin in cross section. With such a configuration, the portion that is liable to become a highest temperature portion can be cooled.

The beam member 77 is disposed within the winding of the cam chain 61. With such a configuration, the portion that is liable to become a highest temperature portion can be cooled.

The beam member 77 is disposed close to either one of the cam chain lines L1, L2 that reciprocate. With such a configuration, the beam member 77 itself can be cooled by air generated by the rotation of the cam chain 61 and splashed oil from the cam chain 61.

The beam member 77 is disposed close to the cam chain line L1 disposed on the side opposite to the tensioner 63. With such a configuration, the cam chain line L1 is stretched in a straight line compared to the cam chain line L2 and hence, the beam member 77 can be disposed as close as possible to the cam chain line L1.

The beam member 77 may be disposed in the vicinity of a mating surface between the cylinder block 24a and the cylinder head 24b. With such a configuration, the portion that is liable to become a highest temperature portion can be cooled.

In this embodiment, one beam member 77 is disposed in the cam chain chamber 66 of the cylinder block 24a. However, the present invention is not limited to such a configuration.

A plurality of beam members 77 may be disposed in the cam chain chamber 66. With such a configuration, the larger the number of beam members 77, the higher the cooling efficiency becomes. In place of disposing the beam member 77 within the winding of the cam chain 61, the beam member 77 may be disposed outside the winding. In the case where the plurality of beam members 77 are disposed, it is sufficient that at least one beam member 77 be disposed in the vicinity of the mating surface between the cylinder block 24a and the cylinder head 24b.

The beam member 77 may obliquely extend between the inner wall 66A and the outer wall 66B of the cam chain chamber 66. Further, the beam member 77 may extend between the inner wall 66A and the outer wall 66B in a state where the beam member 77 is formed with a large width in place of being formed in a strip shape.

In the above-mentioned embodiment, the description has been made by exemplifying an internal combustion engine of a motorcycle. However, the present invention is not limited to such a configuration. The present invention is also applicable to an internal combustion engine of a three-wheeled vehicle that includes two front wheels or two rear wheels, and an internal combustion engine of a vehicle having four wheels or more.

[Configurations Supported by the Above-Mentioned Embodiment]

The above-mentioned embodiment supports the following configurations.

(Configuration 1)

An internal combustion engine including a cylinder block and a cylinder head, and having a cam chain chamber on a side of the cylinder block, in which a beam member that traverses the cam chain chamber is disposed in the cam chain chamber.

With such a configuration, heat of the cylinder portion can be drawn by making use of heat outside the cylinder.

(Configuration 2)

The internal combustion engine described in the configuration 1, in which the beam member is detachably mounted in the cam chain chamber.

With such a configuration, the cam chain has an endless shape and the beam member is detachably mounted. Accordingly, assembling of the endless shaped member is not obstructed.

(Configuration 3)

The internal combustion engine described in the configuration 1 or 2, in which the beam member overlaps with the cylinder chamber of the cylinder block as viewed in a side view.

With such a configuration, the portion that is liable to become a highest temperature portion can be cooled.

(Configuration 4)

The internal combustion engine described in any one of the configurations 1 to 3, in which the beam member is formed on a portion having a thin wall thickness between the cam chain chamber and the cylinder chamber of the cylinder block in cross section of the cylinder block.

With such a configuration, the portion that is liable to become a highest temperature portion can be cooled.

(Configuration 5)

The internal combustion engine described in any one of the configurations 1 to 4, in which a plurality of beam members are disposed in the cam chain chamber.

With such a configuration, cooling efficiency can be increased along with the increase of the number of the beam members.

(Configuration 6)

The internal combustion engine described in any one of the configurations 1 to 5, in which the beam member is disposed within winding of the cam chain.

With such a configuration, the portion that is liable to become a highest temperature portion can be cooled.

(Configuration 7)

The internal combustion engine described in any one of the configurations 1 to 6, in which the beam member is disposed close to either one of cam chain lines that reciprocate in the cam chain chamber.

With such a configuration, the beam member itself can be cooled by air generated by the rotation of the cam chain and splashed oil from the cam chain.

(Configuration 8)

The internal combustion engine described in the configuration 7, in which the beam member is disposed close to the cam chain line on a side opposite to a tensioner.

With such a configuration, the cam chain line on the side opposite to the tensioner is stretched in a straight line compared to the cam chain line on a tensioner side. Accordingly, the beam member can be disposed as close as possible to the fixed cam chain line.

(Configuration 9)

The internal combustion engine described in any one of the configurations 1 to 8, in which the beam member is disposed in the vicinity of a mating surface between the cylinder block and the cylinder head.

With such a configuration, the portion that is liable to become a highest temperature portion can be cooled.

REFERENCE SIGNS LIST

10: saddle riding vehicle
12: power unit
23: crankcase
24: cylinder portion
24a: cylinder block
24b: cylinder head
61: cam chain
63: tensioner
66: cam chain chamber
71: cylinder chamber
73,74: heat radiation fin
77: beam member
78, 79: portion having a thin wall thickness
81: first chain region
82: second chain region
85: combustion chamber
L1, L2: cam chain line

The invention claimed is:

1. An internal combustion engine comprising comprising:
a cylinder head;
a cylinder block including a cylinder chamber and a cam chain chamber each integrally formed in the cylinder block; and
a beam member mounted in the cam chain chamber so as to traverse the cam chain chamber,
wherein the beam member is arranged on an inner wall of the cam chain chamber at a portion in which a wall thickness between the cam chain chamber and the cylinder chamber is thinnest.

2. The internal combustion engine according to claim 1, wherein the beam member is detachably mounted in the cam chain chamber.

3. The internal combustion engine according to claim 1, wherein the beam member overlaps with extends laterally away from the cylinder chamber.

4. The internal combustion engine according to claim 1, wherein the beam member includes a plurality of the beam members disposed in the cam chain chamber.

5. The internal combustion engine according to claim 1, further comprising a cam chain arranged in the cam chain chamber, wherein the beam member is disposed within a winding of the cam chain.

6. The internal combustion engine according to claim 5, wherein the cam chain defines two cam chain lines extending within the cam chain chamber along a rotation path of the cam chain, and
wherein the beam member is disposed closer to a first cam chain line of the two cam chain lines.

7. The internal combustion engine according to claim 6, wherein the first cam chain line is arranged on a side of the cam chain chamber that is opposite to a tensioner.

8. The internal combustion engine according to claim 1, wherein the beam member is disposed adjacent to a mating surface between the cylinder block and the cylinder head.

* * * * *